US009584301B2

(12) United States Patent
Becquet et al.

(10) Patent No.: US 9,584,301 B2
(45) Date of Patent: Feb. 28, 2017

(54) PERIODIC COMMUNICATION METHOD BETWEEN AT LEAST ONE FIRST SYSTEM AND AT LEAST ONE SECOND SYSTEM BY MEANS OF A FULL-DUPLEX SYNCHRONOUS SERIAL LINK

(71) Applicant: Valeo Systemes de Controle Moteur, Cergy Saint Christophe (FR)

(72) Inventors: Valéry Becquet, Molliens-Dreuil (FR); Olivier Garot, Vaureal (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 233 days.

(21) Appl. No.: 14/381,230

(22) PCT Filed: Feb. 27, 2013

(86) PCT No.: PCT/FR2013/050393
§ 371 (c)(1),
(2) Date: Aug. 27, 2014

(87) PCT Pub. No.: WO2013/128112
PCT Pub. Date: Sep. 6, 2013

(65) Prior Publication Data
US 2015/0103682 A1    Apr. 16, 2015

(30) Foreign Application Priority Data
Feb. 28, 2012    (FR) ...................................... 12 51794

(51) Int. Cl.
*H04L 5/14*    (2006.01)
*G06F 13/42*    (2006.01)
(Continued)

(52) U.S. Cl.
CPC ........ *H04L 5/1461* (2013.01); *G06F 13/4291* (2013.01); *H02P 29/00* (2013.01); *H04J 3/14* (2013.01); *H04L 25/026* (2013.01)

(58) Field of Classification Search
CPC ........ G06F 2213/0016; G06F 13/4291; H03K 5/05; H03K 7/08; H04L 25/49;
(Continued)

(56) References Cited

U.S. PATENT DOCUMENTS 4,742,349 A * 5/1988 Miesterfeld ........... G06F 13/385
370/447
6,445,966 B1 * 9/2002 Younger ................... H02P 5/74
318/161
(Continued)

FOREIGN PATENT DOCUMENTS

| EP | 1 011 240 A2 | 6/2000 |
| EP | 1 174 799 A1 | 1/2002 |
| EP | 1 553 731 A2 | 7/2005 |

OTHER PUBLICATIONS

International Search Report for corresponding International Application No. PCT/FR2013/050393, mailed Jun. 20, 2013 (2 pages).

*Primary Examiner* — Jung-Jen Liu
(74) *Attorney, Agent, or Firm* — Osha Liang LLP

(57) ABSTRACT

The invention relates to a periodic communication method between at least one first system (2) and at least one second system (3) by means of a full-duplex synchronous serial link (4), wherein, during a communication period, data are exchanged between the first system (2) and the second system (3), including: at least one message from the first system (2) to the second system (3), at least one message from the second system (3) to the first system (2) and a clock signal, the clock signal being routed by the link (4) over a time interval, the amplitude of which is less than the communication period, the message from the first system (2)
(Continued)

to the second system (3) and the message from the second system (3) to the first system (2) both being routed by the link (4) over said time interval.

16 Claims, 2 Drawing Sheets

(51) Int. Cl.
  *H04L 25/02* (2006.01)
  *H02P 29/00* (2016.01)
  *H04J 3/14* (2006.01)

(58) Field of Classification Search
  CPC .............. H04L 25/4902; Y02B 20/346; H05B 33/0818; H05B 33/0857; G08C 19/22; G05B 2219/21013; G05B 19/0423
  See application file for complete search history.

(56) References Cited

U.S. PATENT DOCUMENTS

| | | | |
|---|---|---|---|
| 2003/0172204 A1* | 9/2003 | Junger | H04L 1/16 710/36 |
| 2004/0027087 A1* | 2/2004 | Hogan | B60H 1/00428 318/569 |
| 2007/0075657 A1* | 4/2007 | Moller | H02P 7/0094 318/77 |
| 2008/0072098 A1* | 3/2008 | Hunsaker | H04L 12/40 713/501 |
| 2008/0115512 A1* | 5/2008 | Rizzo | B60H 1/00428 62/134 |
| 2008/0235411 A1* | 9/2008 | Zhang | G06F 13/4291 710/28 |
| 2008/0238391 A1* | 10/2008 | Williams | H01F 7/1844 323/283 |
| 2008/0247735 A1* | 10/2008 | Kazanzides | H02P 6/165 388/815 |
| 2009/0245344 A1* | 10/2009 | Ploix | G05B 19/0423 375/238 |
| 2009/0281676 A1* | 11/2009 | Beavis | G06F 1/266 700/295 |
| 2010/0125384 A1* | 5/2010 | Wyatt | B60K 7/0007 701/22 |
| 2012/0221183 A1* | 8/2012 | Wu | B60L 15/20 701/22 |

* cited by examiner

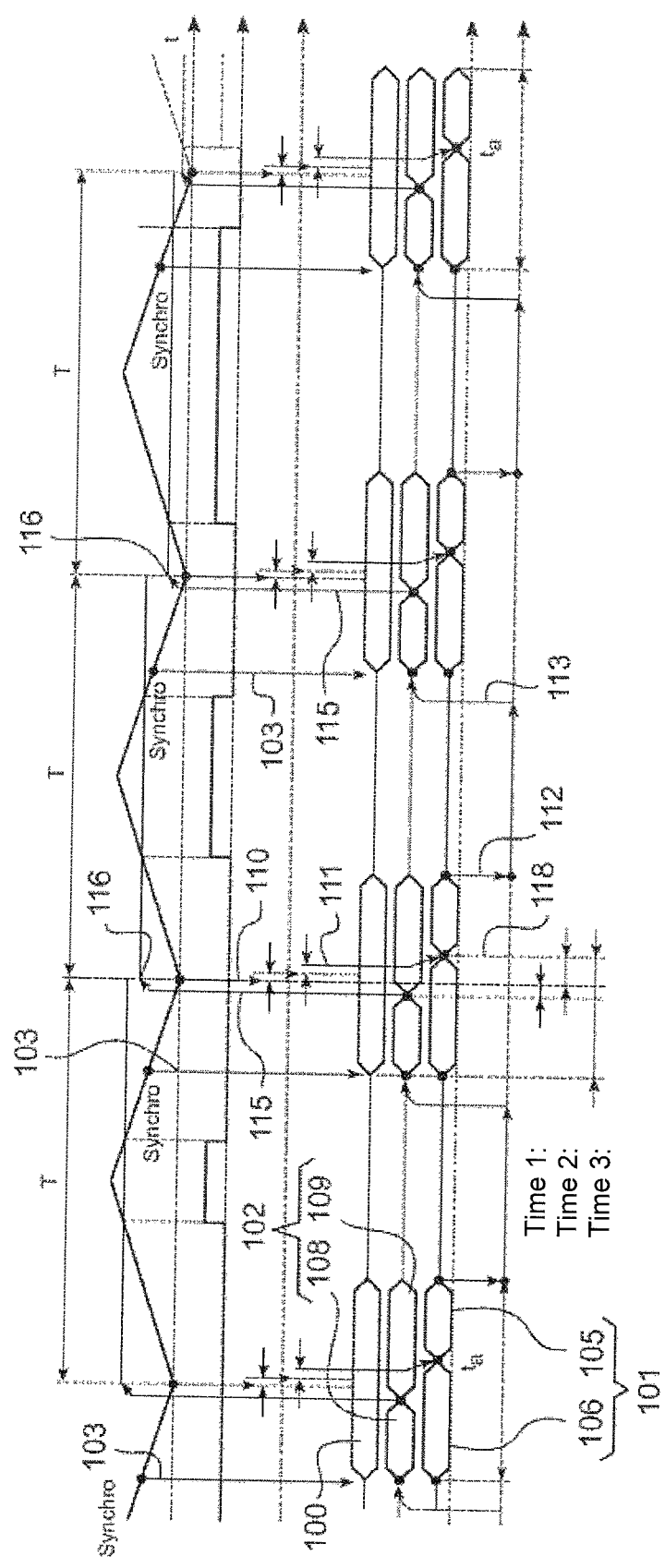

PERIODIC COMMUNICATION METHOD BETWEEN AT LEAST ONE FIRST SYSTEM AND AT LEAST ONE SECOND SYSTEM BY MEANS OF A FULL-DUPLEX SYNCHRONOUS SERIAL LINK

The present invention relates to a periodic communication method between at least one first system and at least one second system by means of a full-duplex synchronous serial link.

In the sense of the present invention, a full-duplex link is a link allowing a simultaneous bidirectional exchange of data.

The invention is notably, but not exclusively, applicable to the communication between systems involved in the control of electronic switches such as transistors.

The first and the second system are for example installed onboard a hybrid or electric automobile vehicle and may be involved in the control of the electronic switches of an inverter interposed between the battery and the electric motor of the vehicle powered by this battery. The inverter may also, or as a variant, form part of an inverter/charger circuit able to be connected to the electrical line supply for charging the battery, notably across the coils of the stator of the electric motor.

The invention aims to allow a remote periodic communication between a first and a second system, complying with all or part of the following constraints:
- guarantee a voltage isolation between the first system and the second system,
- limit as far as possible the number of electrical wires forming the link between the first system and the second system,
- guarantee that, when the first system has to operate in a prescribed time, the transmission of data from the first system to the second system, its processing by the second system and the return of the data thus processed to the first system is carried out during a period of time compatible with this prescribed time,
- guarantee that the link is sufficiently widespread so as not to limit the choice of the components, such as microcontrollers or programmable logic circuits, used for implementing, via the link, the communication between the first and the second system,
- obtain a link allowing a large amount of data with different priority levels to be exchanged,
- reduce the risks of jitter causing the data routed via the link not to arrive in a timely manner at the system needing it for processing.

According to one of its aspects, a subject of the invention is a periodic communication method between at least one first system and at least one second system by means of a full-duplex synchronous serial link, a method in which, during one communication period, data are exchanged between the first system and the second system comprising: at least one message from the first system to the second system, at least one message from the second system to the first system and a clock signal,
- the clock signal being routed via the link over a time interval, the amplitude of which is less than the communication period, the message from the first system to the second system and the message from the second system to the first system both being routed via the link during this time interval.

The employment of a full-duplex synchronous serial link allows the number of wires in the link to be reduced and data having different priority levels to be transmitted.

Furthermore, according to the method hereinabove, the routing of the message or messages from the first system to the second system is synchronized with the routing of the message or messages from the second system to the first system, which allows it to be ensured that each system disposes of a sufficient amount of time for processing the data received via these messages despite the jitter.

The messages exchanged between the first system and the second system may be synchronized with the clock signal.

The link can be of the Serial Peripheral Interface (SPI) type. "SPI" corresponds to the protocol of the same name developed by the company MOTOROLA®. A link of the SPI type is sufficiently common so as not to be too constraining as regards the choice of microcontrollers or of FPGA in the first or second system.

The first system can be a master system, in other words it is this system which takes the initiative in the triggering of the communication with the second system, this second system then being a slave.

When the first system is a master system, the latter can generate the clock signal. As a variant, the clock signal may be generated by the second system which is a slave.

An isolation, notably galvanic, may be interposed between the first system and the second system and the link then passes through this isolation. This isolation allows a voltage isolation to exist when the first system and the second system are in environments with different voltages. The first system is for example a "low voltage" system (LV according to the standard IEC 60038, in other words with a DC voltage in the range between 120 and 1500 V or an AC voltage in the range between 50 and 1000 V) whereas the second system is for example a "very low voltage" system (VLV according to the standard IEC 60038, in other words with a DC voltage below 120 V or an AC voltage below 50 V).

The isolation, notably galvanic, is for example a multichannel isolation, and each wire of the link is received in one of the channels of the isolation.

The invention is not however limited to a link passing through an isolation, and it may also be implemented with a link not passing through any isolation.

The link can have a data rate greater than or equal to 5 Mbits/s, notably higher than 10 Mbits/s, being notably around 20 Mbits/s. Such a data rate allows it to be ensured that the total time needed for sending data from the first system to the second system, for their processing by the second system and for the reception of these processed data by the first system is less than the time prescribed to the first system for its operation. The first system interacts for example with electronic switches, in which case the switching frequency of these electronic switches defines the time prescribed to the first system. This switching frequency is for example around 20 kHz.

Each of the first system and of the second system can comprise a full-duplex module responsible for the communication with the other system.

As a variant, one of the first system and of the second system can comprise a first half-duplex module responsible for sending the data over the link and a second half-duplex module responsible for receiving the data routed via the link.

One of the first system and of the second system can comprise at least one programmable logic circuit (FPGA) and the other of the first system and of the second system can comprise at least one microcontroller or at least one microprocessor.

One of the first system and of the second system can interact with a generator of duty cycle values and the other of the first system and of the second system can interact with an electrical circuit comprising an inverter and an electric motor. The inverter can comprise electronic switches, for example transistors, which may be transistors of the bipolar, field-effect or IGBT type.

When it is master, the first system can comprise a programmable logic circuit. In this case, the second system is slave and it can comprise a microcontroller or microprocessor.

When it is slave, the first system can comprise a microcontroller or a microprocessor and the second system is then master and can comprise a programmable logic circuit.

The data routed via the link and other than the clock signal can consist of duty cycle values for electronic switches and values of current measured in at least one phase of a stator of an electric motor.

As a variant, the link can route other data in addition to the clock signals, the duty cycle values for electronic switches and the measured values of current.

According to this variant, each message sent by the first system can first of all comprise secondary data then primary data, the primary data being notably the values of current measured in at least one phase of an electric motor stator. The secondary data can have a priority level lower than the priority level of the primary data.

When the first system interacts with the electrical circuit comprising the inverter and the electric motor, the primary data sent by the first system can be values of current measured in one or more phases of the stator. The secondary data can be an error flag sent to the second system, a mode of operation of the first system, temperature values or a multiplexing identifier, for example.

Again according to this variant, each message sent by the second system to the first system can first of all comprise primary data, notably the duty cycle values to be applied to electronic switches of an inverter, then secondary data.

When the second system interacts with the duty cycle generator, the primary data sent by the second system can be duty cycle values to be applied to the electronic switches of the inverter with which the first system interacts. The secondary data sent by the second system can be a request for reset resulting from an error flag received previously, calibrations associated with the mode of operation requested for the first system, a multiplexing identifier, or else limiting duty cycle values, for example.

The link does not have to simultaneously route the primary data sent by the first system to the second system and the primary data sent by the second system to the first system.

The link may or may not simultaneously route secondary data sent by the first system to the second system and secondary data sent by the second system to the first system.

When the first system interacts with an electrical circuit comprising an inverter and an electric motor and when the second system interacts with a generator of duty cycle values, at least one communication period can comprise the following steps:
  (i) measurement of values of current in at least one phase of the stator of the electric motor, this measurement notably taking place on the initiative of the first system,
  (ii) routing via the link to the second system of these values in the form of the primary data sent by the first system,
  (iii) processing by the second system of the received values and generation of duty cycle values for the electronic switches of the inverter,
  (iv) routing via the link to the first system of these duty cycle values in the form of the primary data sent by the second system, and
  (v) processing by the first system of these values received and application of these duty cycle values by the switches of the inverter.

The step (iii) for processing by the second system of the received values and for generation of duty cycle values for the switches of the inverter can have a duration shorter than or equal to the duration corresponding to the difference between the communication period and the amplitude of the time interval for routing the clock signal.

When the clock signal is generated by one of the first and of the second system, this clock signal received by the other of the first and of the second system can be returned simultaneously with its reception to the system having generated it, in such a manner as to avoid the delay induced by the routing of the data via the link preventing the first system and the second system from sampling the messages that they receive synchronously with the clock signal, in accordance with what is described in the application filed in France by the applicant on 19 Dec. 2011 under the n° 11 61961. The content of this application is incorporated by reference into the present application, at least with regard to the various embodiments of the link allowing such a return of the received clock signal.

Another subject of the invention, according to another of its aspects, is an assembly configured to allow the implementation of the method hereinabove.

Yet another subject of the invention, according to another of its aspects, is a periodic communication method between at least one first system and at least one second system by means of a full-duplex synchronous serial link, a method in which, during one communication period, data are exchanged between the first system and the second system comprising:
  at least one message from the first system to the second system,
  at least one message from the second system to the first system, and
  a clock signal,
    the clock signal being routed via the link over a time interval, the amplitude of which is less than the communication period, the message from the first system to the second system and the message from the second system to the first system both being routed via the link over said time interval, and one communication period comprising the following steps:
  (i) measurement of values of at least one electrical or mechanical quantity within a device interacting with the first system,
  (ii) routing via the link to the second system of these values sent by the first system,
  (iii) processing by the second system of the received values and generation of resultant values,
  (iv) routing via the link to the first system of these resultant values sent by the second system, and
  (v) processing by the first system of these resultant values and application of these resultant values in the device.

The resultant values can be determined in such a manner as to regulate said mechanical or electrical quantities and then be applied during the step (v) to the device for this purpose.

These quantities are for example a voltage, a current, a speed. As a variant, the quantity could be thermal, such as a temperature.

The step (iii) for processing by the second system of the received values and for generation of resultant values can have a duration less than or equal to the duration corresponding to the difference between the communication period and the amplitude of the time interval for routing the clock signal.

Each message sent by the first system can first of all comprise secondary data then primary data, and each message sent by the second system can first of all comprise primary data then secondary data.

The link does not have to simultaneously route the primary data sent by the first system to the second system and the primary data sent by the second system to the first system.

During the step (ii), the values sent by the first system can be routed in the form of the primary data, and during the step (iv), the resultant values sent by the second system can be routed in the form of the primary data.

The device can comprise electronic switches, and the resultant values can be duty cycle values for these switches.

The term "electronic switches" notably denotes transistors, for example of the field-effect, bipolar or IGBT type.

The device is for example an electrical circuit comprising a static converter and an electrical winding of an electric motor.

The static converter is for example a DC/DC voltage converter or a DC/AC voltage converter, otherwise known as an "inverter".

The electrical winding of the motor is for example a stator winding or a rotor winding. The motor may be a DC motor, an AC motor or a variable reluctance motor.

The communication period can comprise the following steps:
(i) measurement of values of current in the electrical winding of the electric motor,
(ii) routing via the link to the second system of these values in the form of the primary data sent by the first system,
(iii) processing by the second system of the received values and generation of duty cycle values for the electronic switches of the static converter,
(iv) routing via the link to the first system of these duty cycle values in the form of the primary data sent by the second system, and
(v) processing by the first system of these received values and application of these values to the electronic switches of the static converter.

The electrical winding can be a stator and/or multiphase, and during the step (i), values of current in at least one phase of this electrical winding can be measured.

The second system can interact with a generator of duty cycle values.

The link can be a link of the Serial Peripheral Interface (SPI) type.

The first system can be master of the communication, "master" having the same meaning as that hereinabove.

An isolation can be interposed between the first system and the second system, and the link can pass through this isolation.

The link has for example a data rate greater than or equal to 5 Mbits/s, notably higher than 10 Mbits/s, being notably around 20 Mbits/s.

One of the first system and of the second system comprises for example at least one programmable logic circuit and the other of the first system and of the second system comprises at least one microcontroller or at least one microprocessor.

Preferably, the first system comprises at least one programmable logic circuit and the second system comprises at least one microprocessor.

The invention will be better understood upon reading the description that follows of one non-limiting example of implementation of the latter and upon examining the appended drawings in which:

FIG. 2 is a timing diagram illustrating a communication sequence when the method is implemented in the assembly in FIG. 1.

FIG. 1 shows the layer 1 according to the OSI model of an assembly 1 within which the method according to the invention can be implemented.

Figure 1:
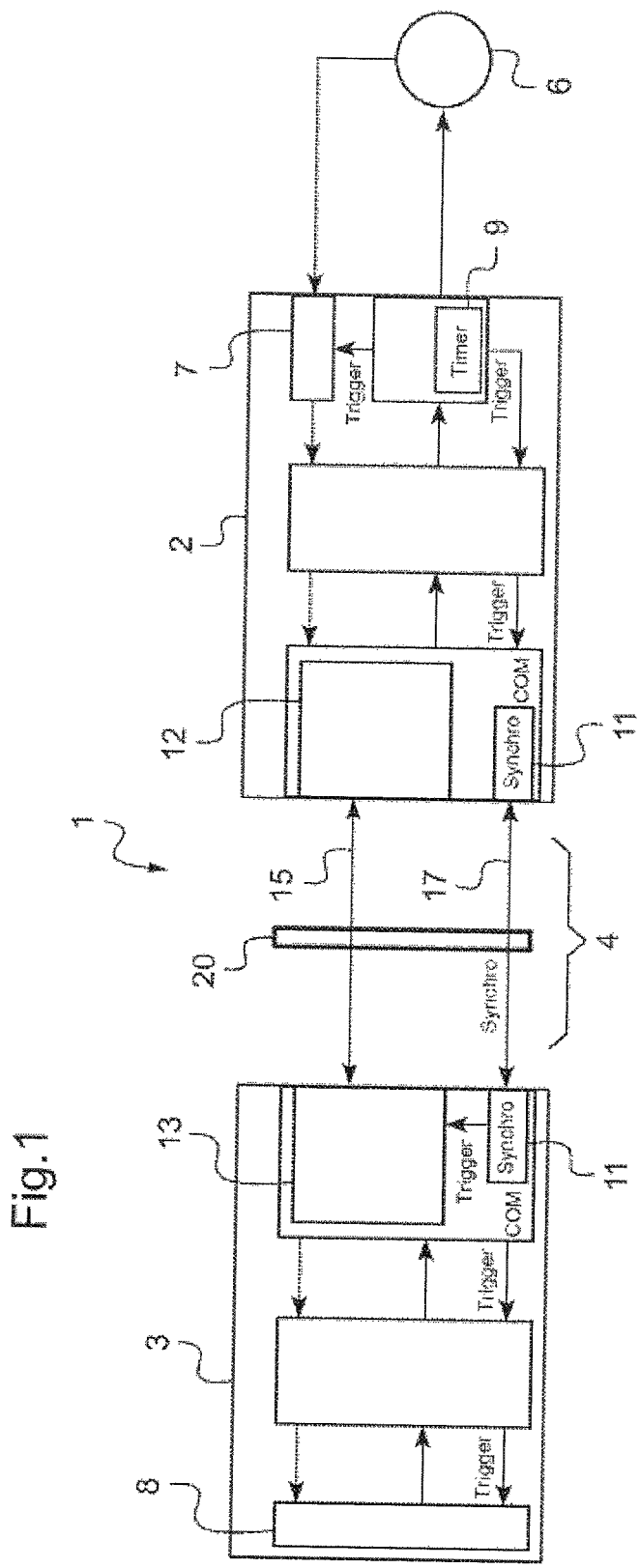
FIG. 1 shows schematically the physical layer according to the OSI model of an assembly within which the method according to the invention can be implemented.

In the example in FIG. 1, the assembly 1 comprises a first system 2 and a second system 3 exchanging data by means of a full-duplex synchronous serial link 4.

In the example being considered, the assembly 1 is installed onboard a vehicle which comprises an electrical circuit comprising an electric motor 6, a battery and an inverter interposed between the battery and the electric motor. The electrical circuit can comprise a connector allowing the battery to be charged via an electrical supply system, notably across the coils of the stator of the electric motor 6.

In the example in question, the assembly 1 forms a part of a device for controlling the electronic switches of the inverter. These switches have for example a switching frequency of the order of a few tens of kHz, for example 20 kHz. They are for example transistors of the bipolar, field-effect or IGBT type.

The first system 2 is for example a peripheral unit interacting with the inverter so as to control its electronic switches and with the electric motor 6 so as to measure the current flowing in each phase of the stator of the motor 6, the latter being notably multiphase, for example three-phase.

The first system 2 sends for example duty cycle values to the electronic switches of the inverter and receives, after passage through an analog/digital converter 7, values of the currents measured in the phases of the stator of the motor 6.

In the example in question, the second system 3 incorporates a generator 8 of duty cycle values as a function of values of current. This generator 8 implements for example a software processing application. As a variant, the generator 8 is external to the second system 3.

The first system 2 is master in the example in FIG. 1, in other words the communication between the first system 2 and the second system 3 is triggered on the initiative of the first system 2. The latter comprises for example a trigger module 9 from which this triggering originates.

Still in the example in FIG. 1, the clock signal is generated by the second system 3 which is slave. Synchronization modules 11 are integrated into the first system 2 and into the second system 3 in order to enable the timing control of the communication by the first system 1. In one variant not shown, the clock signal can be generated by the first system 2.

In the example in question, the first system 2 uses a programmable logic circuit (FPGA). The first system 2 comprises, in this example, a full-duplex module 12 responsible for sending and for receiving data over the link 4. In this example, the second system 3 also comprises a full-duplex module 13.

The link 4 can be of the SPI type, in which case each module 12, 13 is a full-duplex SPI controller.

In one variant not shown, one of the first system 2 and of the second system 3 can comprise two half-duplex modules, one of these two half-duplex modules being responsible for the transmission by said system 2 or 3 of data over the link 4 whereas the other of these two modules is responsible for receiving data routed to said system 2 or 3 via the link 4.

The link 4 allows, in the example in question, the transmission by the first system 2 of primary data, being values of current, to the second system 3 and of secondary data which can be an error flag sent to the second system 3, a mode of operation of the first system 2, temperature values or a multiplexing identifier.

Again in this example, the link 4 allows the transmission by the second system 3 of primary data being duty cycle values generated on the basis of the values of current by the generator 8 and of secondary data which can be a request for reset resulting from an error flag received previously, calibrations associated with the mode of operation requested for the first system 2, a multiplexing identifier, or else limiting duty cycle values, for example.

The link 4 comprises, in the example in FIG. 1, a bundle of wires 15 allowing the messages between the first system 2 and the second system 3, together with the clock signal, to be exchanged.

As disclosed in the patent application filed in France by the applicant on 19 Dec. 2011 under the n° 11 61961, the bundle 15 can be composed of four wires, namely a first wire responsible for the routing of the messages from the first system 2 to the second system 3, a second wire responsible for the routing of the messages from the second system 3 to the first system 2, a third wire responsible for the routing of the clock signal generated, in the example described, by the second system 3 and a fourth wire connecting a region of the third wire and the second system. Said region of the third wire from where the fourth wire originates can be positioned in such a manner that the clock signal sent by the fourth wire to the second system 3 is, within said region, substantially identical to the clock signal received by the first system 2.

Again in the example in FIG. 1, the link 4 comprises a wire 17 connecting the synchronization modules 11 together and enabling the timing control of the communication by the first system 2, even though the latter does not generate the clock signal.

In the example in FIG. 1, the first system 2 is galvanically isolated with respect to the second system 3. This galvanic isolation 20 is here formed by means of a transformer, but the invention is not limited to a particular embodiment of the galvanic isolation. The galvanic isolation 20 is, in this example, a multichannel isolation, each wire of the bundle 15 being received in its own channel of the isolation 20. The wire 17 of the link 4 can be received in another channel of the isolation 20.

Where appropriate, the isolation 20 can be a single block or be formed by the joining of two separate isolators, the bundle 15 for example passing through one of the isolators, whereas the wire 17 passes through the other isolator.

A timing diagram will now be described with reference to FIG. 2 that illustrates one example of a communication sequence within the network layer shown in FIG. 1 of the assembly 1.

As can be seen, the communication established by means of the link 4 takes place, in the example, according to a communication period t, the latter notably being in the range between 25 µs and 500 µs, notably between 25 µs and 250 µs, being for example around 100 µs.

During each period, a clock signal 100 is sent by the second system 3 to the first system 2. This clock signal 100 is sent over a time interval, the amplitude of which $t_a$ is less than the period t.

As can be seen in FIG. 2, during the time interval for routing the clock signal 100, a message 101 is sent by the first system 2 to the second system 3 and a message 102 is sent by the second system 3 to the first system 2. As can be seen in FIG. 2, the message 101 and the message 102 are sent simultaneously with the message 100. This simultaneous transmission is for example triggered by a synchronization message 103 generated by the trigger module 9. The entirety of the message 101 and the entirety of the message 102 are, in the example being considered, routed over the whole time interval for routing the clock signal 100.

Thus, a communication period can be divided up into a first part during which the link simultaneously routes the clock signal 100 and the messages 101 and 102 and a second part during which no data is routed via the link 4, this second part being alternatively referred to as the inter-frame period.

As shown in FIG. 2, the message 101 sent by the first system 2 comprises the primary data 105 and the secondary data 106 mentioned with reference to FIG. 1. In the example in question, the secondary data 106 is sent before the primary data 105.

Again in the example in FIG. 2, the message 102 sent by the second system 3 comprises the primary data 108 and the secondary data 109 mentioned with reference to FIG. 1. In the example in question, the primary data 108 are sent before the secondary data 109.

The primary data 105 and 108 each take for example the form of an atomic block having a priority level higher than that of the atomic blocks forming the secondary data 106 and 109.

Each block forming the primary data 105 and 108 can end with redundancy control data, allowing it to be ensured that the entirety of the primary data has indeed been received after routing via the link 4. The block forming the secondary data 109 can also end with redundancy control data, allowing it to be ensured that the entirety of the secondary data has indeed been received after routing via the link 4. Where necessary, the block forming the secondary data 106 can also end with redundancy control data.

As can be seen in the FIG. 2, the primary data 105 and 108 do not have to be routed at the same time by the link 4, the primary data 105 being routed while secondary data 109 are being routed and the primary data 108 being routed while secondary data 106 are also being routed. On the other hand, a part of the secondary data 106 may be routed via the link 4 at the same time as a part of the secondary data 109.

Furthermore, as can be seen in FIG. 2, each message 101 sent by the first system 2 to the second system 3 can comprise a larger amount of secondary data 106 than of primary data 105. Similarly, each message 102 sent by the first system 2 to the second system 3 can comprise a larger amount of secondary data 109 than of primary data 108.

Several steps will now be described that are carried out during a period N of communication between the first 2 and the second 3 system when it is sought to calculate duty cycle values for the electronic switches of the inverter.

During a first step, an analog acquisition of the currents flowing in the phases of the stator of the electric motor 6 is carried out upon the initiative of the first system 2. This step is initiated upon a command 110 given by the trigger module 9 and takes place right at the start of the period N. During this step, the clock signal 100 and the messages 101 and 102 are routed via the link 4, after the generation at the end of the preceding period N−1 of a synchronization message 103. At this stage, the message 101 is formed by the secondary data 106, whereas the message 102 is formed by the secondary data 109. These analog values of current are digitized by the converter 7, conditioned 111 by the full-duplex module 12 of the first system 2 then routed 118 during a second step in the fowl of primary data 105 via the link 4 to the second system 3.

These primary data 105 are received 112 by the full-duplex module 13 of the second system 3 and sent to the generator of duty cycle values 8. This generator 8, on the basis of the data coming from the analog values of currents previously obtained, determines the duty cycle values to be applied to each electronic switch of the inverter during the following period N+1. At the end of this step, the duty cycle values thus determined are transmitted 113 to the full-duplex module 13 of the second system 3.

The duty cycle values are then routed in the form of primary data 108 to the first system 2 via the link 4 upon reception of the synchronization message 103.

These data 108 are received 115 by the full-duplex module 12 of the first system 2, then the first system 2 sends a command to the electronic switches of the inverter by applying to them 116, at the start of the following period N+1, the duty cycle values calculated on the basis of the currents flowing in the phases of the motor 6 during the period N.

Upon examining FIG. 2, it can be observed that the exemplary method described allows the application during the period N+1 of duty cycle values calculated on the basis of the currents measured during the period N despite the return journey via the link 4 and the time for processing by the first system 2 and the second system 3.

For this purpose, the following must be calibrated:
a first time between the reception 115 by the full-duplex module 12 of the duty cycle values to be applied during the following period N+1 and the application 116 of these duty cycle values right at the start of said period N+1,
a second time between the reception of the message 110 for acquisition of the values right at the start of each period and the start 118 of the routing of the values of current thus acquired via the link 4, and
a third time combining the routing of the duty cycle values via the link 4 in the form of the primary data 108, the first time hereinabove and the second time hereinabove. This third time can correspond to the period of time during which the secondary data 106 are routed from the first system 2 to the second system 3.

In the example described, each system 2 or 3 comprises a full-duplex module 12 or 13 but in examples not shown, the first system 2 and/or the second system 3 can comprise a half-duplex module responsible for the transmission of data over the link 4 and a half-duplex module responsible for the reception of data routed via the link 4

The method which has just been described can allow all or part of the following advantages to be obtained:
being transparent vis-à-vis the generator of duty cycle values,
using an isolated link with a reduced number of wires
carrying out acquisitions of analog current and disposing of a wide flexibility with regard to the choice of the number of electronic switches to be controlled by PWM,
rendering the master system autonomous in the case of a failure,
sending complementary data allowing information on the state of the systems, any errors, the temperature, etc. to be made available,
verifying the integrity of the received data,
exchanging data via the link without having to make use of the processor (CPU) when each of the first system and of the second system uses a microcontroller.

The invention is not limited to the examples which have just been described.

The expression "comprising a" should be understood as being synonymous with the expression "comprising at least one", except where the contrary is specified.

The invention claimed is:

1. A periodic communication method between at least one first system and at least one second system by a full-duplex synchronous serial link, a method in which, during one communication period, data are exchanged between the first system and the second system comprising:
at least one message from the first system to the second system
at least one message from the second system to the first system and a clock signal,
the clock signal being routed via the link over a time interval, wherein an amplitude of the clock signal is less than the communication period, the message from the first system to the second system and the message from the second system to the first system both being routed via the link over said time interval, and a communication period comprising the following steps:
(i) measurement of values of at least one electrical or mechanical quantity within a device interacting with the first system,
(ii) routing via the link to the second system of these values sent by the first system,
(iii) processing by the second system of the values received and generation of resultant values,
(iv) routing via the link to the first system of these resultant values sent by the second system, and
(v) processing by the first system of these resultant values and application of these resultant values in the device.

2. The method as claimed in claim 1, wherein the resultant values are determined in such a manner as to regulate said mechanical or electrical quantity or quantities and are applied during the step (v) to the device for this purpose.

3. The method as claimed in claim 1, wherein the step (iii) for processing by the second system of the values received and for generation of resultant values has a duration which is shorter than or equal to the duration corresponding to the difference between the communication period and the amplitude of the time interval for routing the clock signal.

4. The method as claimed in claim 1, wherein each message sent by the first system firstly comprises secondary data then primary data, and wherein each message sent by the second system firstly comprises primary data then secondary data,
the link not routing simultaneously the primary data sent by the first system to the second system and the primary data sent by the second system to the first system.

5. The method as claimed in claim 4, wherein:
during the step (ii), the values sent by the first system are routed in the form of the primary data, and
during the step (iv), the resultant values sent by the second system are routed in the form of the primary data.

6. The method as claimed in claim 1, wherein the device comprises electronic switches, and the resultant values are duty cycle values for the electronic switches.

7. The method as claimed in claim 6, wherein the device is an electrical circuit comprising a static converter and an electrical winding of an electric motor.

8. The method as claimed in claim 7, wherein the communication period further comprises the following steps:
(vi) measurement of values of current in the electrical winding of the electric motor,
(vii) routing via the link to the second system of these values in the form of the primary data sent by the first system,
(viii) processing by the second system of the received values and generation of duty cycle values for the electronic switches of the static converter,
(ix) routing via the link to the first system of these duty cycle values in the form of the primary data sent by the second system, and
(x) processing by the first system of the values received and application of the values to the electronic switches of the static converter.

9. The method as claimed in claim 8, wherein the electrical winding is a stator and multiphase winding, and in which, during the step (vi), values of current are measured in at least one phase of this stator winding.

10. The method as claimed in claim 9, wherein the static converter is an inverter.

11. The method as claimed in claim 6, wherein the second system interacts with a generator of duty cycle values.

12. The method as claimed in claim 1, wherein the link is a link of the Serial Peripheral Interface (SPI) type.

13. The method as claimed in claim 1, wherein the first system is the communication master.

14. The method as claimed in claim 1, wherein an isolation is interposed between the first system and the second system and the link passes through this isolation.

15. The method as claimed in claim 1, wherein the link has a data rate greater than or equal to 10 Mbits/s.

16. The method as claimed in claim 1, wherein one of the first system and of the second system comprises at least one programmable logic circuit and the other of the first system and of the second system comprises at least one microcontroller or at least one microprocessor.

* * * * *